United States Patent
Chene et al.

(10) Patent No.: US 9,400,399 B2
(45) Date of Patent: Jul. 26, 2016

(54) SPECTACLE FRAME HAVING ROTATING ARMS

(71) Applicants: Richard Chene, Neuilly (FR); Dominique Delamour, Les Mesnuls (FR); Alain Miklitarian, Paris (FR)

(72) Inventors: Richard Chene, Neuilly (FR); Dominique Delamour, Les Mesnuls (FR); Alain Miklitarian, Paris (FR)

( * ) Notice: Subject to any disclaimer, the term of this patent is extended or adjusted under 35 U.S.C. 154(b) by 0 days.

(21) Appl. No.: 14/355,806

(22) PCT Filed: Oct. 29, 2012

(86) PCT No.: PCT/EP2012/071414
§ 371 (c)(1),
(2) Date: May 1, 2014

(87) PCT Pub. No.: WO2013/064470
PCT Pub. Date: May 10, 2013

(65) Prior Publication Data
US 2015/0029458 A1 Jan. 29, 2015

(30) Foreign Application Priority Data
Nov. 2, 2011 (FR) .................................... 11 59905

(51) Int. Cl.
*G02C 5/22* (2006.01)
*G02C 5/00* (2006.01)

(52) U.S. Cl.
CPC *G02C 5/22* (2013.01); *G02C 5/006* (2013.01); *G02C 5/229* (2013.01); *G02C 5/2227* (2013.01); *G02C 2200/26* (2013.01)

(58) Field of Classification Search
CPC ...... G02C 5/22; G02C 5/2209; G02C 5/2218; G02C 5/2227; G02C 2200/04; G02C 2200/06
USPC ............................ 351/113–115, 153; 16/228
See application file for complete search history.

(56) References Cited

U.S. PATENT DOCUMENTS

| 6,428,166 B2 * | 8/2002 | Tiberghien .................... 351/153 |
| 2005/0146675 A1 | 7/2005 | Benavides et al. |
| 2011/0116033 A1 * | 5/2011 | Jacquemin ...................... 351/63 |

FOREIGN PATENT DOCUMENTS

| FR | 2751431 | 1/1998 |
| GB | 626533 | 7/1949 |

* cited by examiner

*Primary Examiner* — Huy K Mai
(74) *Attorney, Agent, or Firm* — Duane Morris LLP; Gregory M. Lefkowitz

(57) ABSTRACT

The frame includes a front surface (10) that is extended by two side tenons (12) and two arms (30) that are hinged onto the tenons (12) about the hinge axes (X-X') of two hinges (50). The hinges (50) each include a front surface element (51) that rigidly connected to a tenon (12) and an arm element (52) that is rigidly connected to an arm (30). Each arm (30) is set up such as to pass, through rotation about said hinge axis (X-X'), from an open position for which the tenon (12) extends the tenon (12) to a closed position for which said arm is clamped into the front surface (10). In at least one of the hinges (50), the hinge axis (X-X') is substantially perpendicular to the tenon (12) and to the arm (30). The front surface element (51) and the arm element (52) are set up such as to provide, between said tenon (12) and said arm (30), a space (60) for freely passing from the open position to the closed position.

13 Claims, 3 Drawing Sheets

SPECTACLE FRAME HAVING ROTATING ARMS

CROSS-REFERENCE TO RELATED APPLICATIONS

This application is a §371 national stage entry of International Application No. PCT/EP2012/071414, filed Oct. 29, 2012, which claims priority to French Patent Application No. 1159905 filed Nov. 2, 2011, the entire contents of which are incorporated herein by reference.

The field of the invention is that of spectacle frames.

A spectacle frame generally comprises a front face which is extended by two side lugs, and two temples which are articulated to the lugs about the hinge pins of two hinges. Each hinge comprises a front face member, which is rigidly connected to the corresponding side lug, and a temple member, which is rigidly connected to said temple, these two members being articulated to the hinge pin of each hinge.

The hinge pins of the hinges are substantially parallel to the front face. Therefore, each temple can successively occupy two positions relative to the side lug with which it is associated by rotating about the hinge pin of the corresponding hinge. In a first position, referred to as an open position, the temple extends the lug and extends substantially at a right angle to the general plane of the front face, which allows the frame to be worn. In a second position, referred to as a closed position, the temple is substantially parallel to the front face and pressed thereagainst, which makes it possible to reduce the volume of the spectacle frame.

The disadvantage of such a spectacle frame lies in its thickness in the closed position, which cannot be made sufficiently low due to the shape of the temples and lugs. This thickness can prove to be even greater in the case of frames which are adapted for practising sporting disciplines where, in order to prevent the wearer from losing—or feeling as though he or she is losing—his or her frame, it is important that said frame fit as closely as possible to his or her face, to the extent that the edges of the front face are practically parallel to the temples of the face of the wearer.

The object of the present invention is to limit the thickness of the above-described spectacle frame in the closed position, whilst also providing its wearer with adequate comfort and performance, particularly when practising a sporting discipline.

Another object of the present invention is to allow the wearer of the frame, when said frame is on his or her face, to adjust the inclination of the front face.

For this purpose, according to the invention, the spectacle frame, comprising a front face which is extended by two side lugs, and two temples which are articulated to the lugs about the hinge pins of two hinges, the hinges each comprising a front face member which is rigidly connected to a lug, and a temple member which is rigidly connected to a temple, each of the temples being arranged to pass, by rotation about said hinge pin, from an open position, where said temple extends the lug, to a closed position, where said temple is brought closer to the front face, is notable in that, in at least one of the hinges, the hinge pin is substantially perpendicular to the lug and to the temple, and the front face member and the temple member are arranged so as to provide, between said lug and said temple, a clearance for the passage from the open position to the closed position.

Therefore, by means of the present invention, by anticipating similar shapes of the temples and the front face, said temples can pivot about the hinge pins of the hinges so that said temples are as close as possible to the front face when in the closed position.

In addition, by means of the present invention, the wearer can adjust the inclination of the front face by pivoting said face relative to the temples.

Moreover, the clearance, formed between the side lug and the temple, makes it possible to provide play between these two parts so that, when said temple pivots about the hinge pin of the hinge (and thus opposite said lug), these parts do not rub against one another, but instead enjoy a certain amount of freedom in their relative movements, which facilitates the passage of the temples from their open position to their closed position.

According to a first embodiment of the invention, the front face member and the temple member of at least one hinge are a screw and a cap nut respectively. In this case, the screw and the cap nut of the hinge can be fixed to the lug and the temple respectively by means of O-rings.

According to a second embodiment of the invention, the front face member and the temple member of at least one hinge are a hinge screw and a ball nut respectively. In this case, the ball nut can be embedded at least in part in the temple.

Moreover, in order to provide a larger clearance between the temple and the side lug and thus further facilitate the rotation of the temple opposite the lug, a space can be provided between said lug and said temple in order to house a compressed spring, which is arranged to bear against said lug and said temple.

Preferably, a catch for stopping rotation of the temple in the closed position is arranged on the lug and said temple, which makes it possible to lock said temple once it has reached its closed position.

Preferably, the temples are flexible. Therefore, when the temples are in the open position, the frame is capable of adapting to the shape of the face of the wearer, whereas in the closed position, said temples are arranged to sit as close as possible to the front face.

The present invention also relates to a hinge for a spectacle frame according to any of the above-described embodiments.

The figures of the appended drawing will show how the invention can be achieved. In these figures, identical reference signs denote like technical elements.

Figure 1:
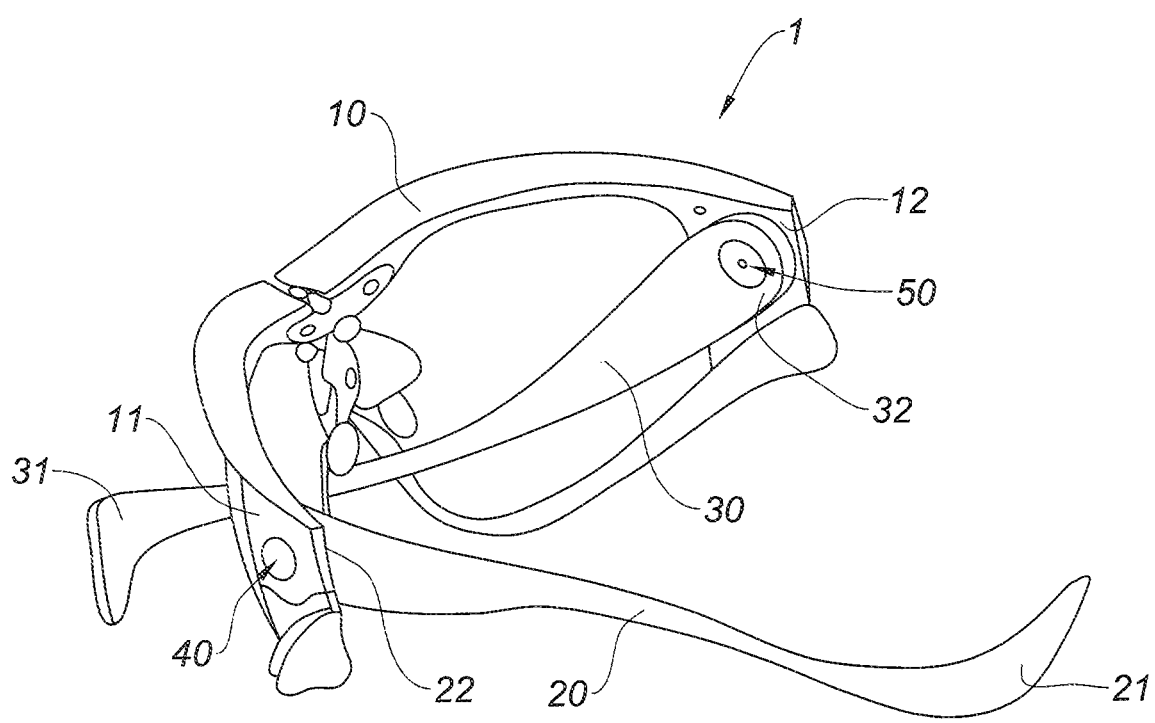
FIG. 1 is a perspective view of a spectacle frame according to a first embodiment of the present invention.

The spectacle frame 1, shown schematically in FIG. 1, illustrates a first embodiment of the present invention. It comprises a front face 10 which is intended to receive generally optical lenses and is laterally extended, on each side, by a left side lug 11 and a right side lug 12. The frame 1 also comprises a left temple 20, which is articulated to the left side lug 11 about the hinge pin of a left hinge 40, and a right temple 30, which is articulated to the right side lug 12 about the hinge pin of a right hinge 50.

The left temple 20 comprises two ends: a free rear end 21, the shape of which is adapted to that of the face of the wearer, and a front articulation end 22, at which said left temple 20 is intended to be articulated to the lug 11. Likewise, the right temple 30 comprises two ends: a free rear end 31, the shape of which is adapted to that of the face of the wearer, matching the rear end 21 of the left temple 20, and a front articulation end 32, at which said right temple 30 is intended to be articulated to the lug 12.

The left hinge 40 and right hinge 50 are similar. The hinge pin of the left hinge 40 is substantially perpendicular to the left side lug 11 and the left temple 20. Likewise, the hinge pin of the right hinge 50 (denoted by the reference sign X-X' in FIGS. 2 and 3) is substantially perpendicular to the right side lug 12 and the right temple 30.

In this way, by rotating each of the temples 40 and 50 about the hinge pin of the hinge which is associated therewith, said temple can occupy either an open position, where it extends the side lug associated therewith and extends substantially at a right angle to the general plane of the front face 10, or a closed position, where it is substantially parallel to the front face 10 and pressed thereagainst.

In the example of the frame shown in FIG. 1, the left temple 20 is in the open position, whereas the right temple 30 is in the closed position. When the two temples are in the open position, the frame 1 is arranged to be worn by surrounding the skull of its wearer. When the two temples are in the closed position, the frame 1 is optimally compact.

This particular arrangement of the hinge pins of the hinges 40 and 50 has the advantage of bringing the temples 20 and 30 and the front face 10 closer together when they said temples in the closed position. For this purpose, the temples 20 and 30 have a shape which is adapted to the shape of the front face 10, in particular a shape similar to that of the front face 10, so that said temples can be pressed optimally against said front face. In addition, it will be noted that, by rotating the temples 20 and 30 about the hinge pins of the hinges 40 and 50, the wearer can easily adjust the inclination of the front face 10.

Figure 2:
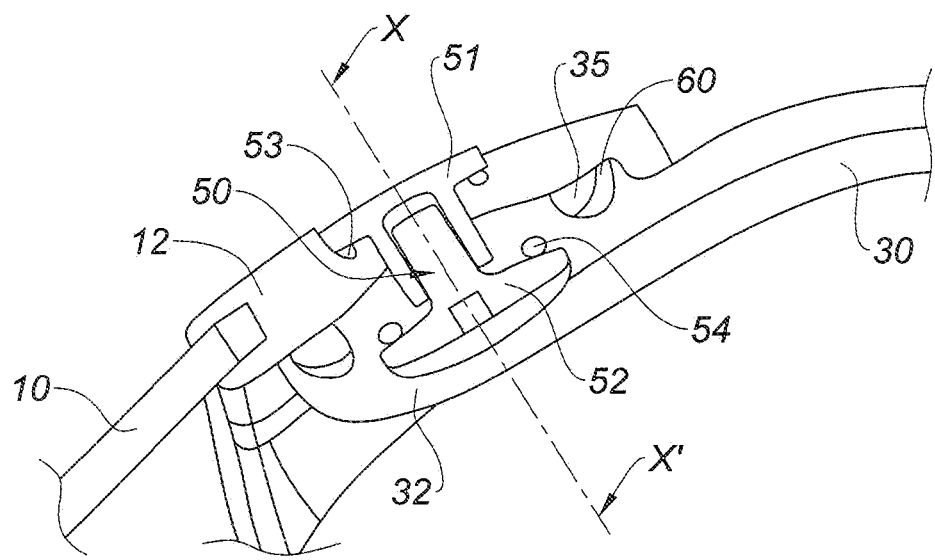
FIG. 2 is an enlarged perspective view of a hinge of the spectacle frame in FIG. 1.

FIG. 2 shows, in greater detail, the right hinge 50. Said hinge comprises a front face member 51, which is rigidly connected to the right side lug 12, and a temple member 52, which is rigidly connected to the right temple 30. In this example, the front face member 51 is in the form of a cap nut and the temple member 52 is in the form of a screw which is capable of cooperating with the nut. The nut 51 and the screw 52 are moreover fixed to the right side lug 12 and to the front end 32 of the right temple 30 respectively by means of O-rings having the reference signs 53 and 54. Therefore, the right hinge 50 makes it possible to couple the right side lug 12 to the front end 32 of the right temple 30.

Moreover, according to the present invention, the nut 51 and the screw 52 forming the right hinge 50 are arranged relative to one another so that the right side lug 12 and the front end 32 of the right temple 30 are not fully pressed against one another, but instead provide a space 60. The purpose of this space 60, referred to as a clearance, is to make it possible for the temples 20 and 30 to pass easily and without rubbing from their open position to their closed position (and vice versa).

Therefore, the right side lug 12 and the right temple 30 can have sufficient play between them that, when said right temple 30 pivots about the hinge pin X-X' (and thus opposite said right side lug 12), said temple does not rub against said lug 12, which further facilitates the passage of the temple 30 from its open position to its closed position.

A clearance (not shown) similar to the space 60 is also provided at the left hinge 40.

Figure 3:
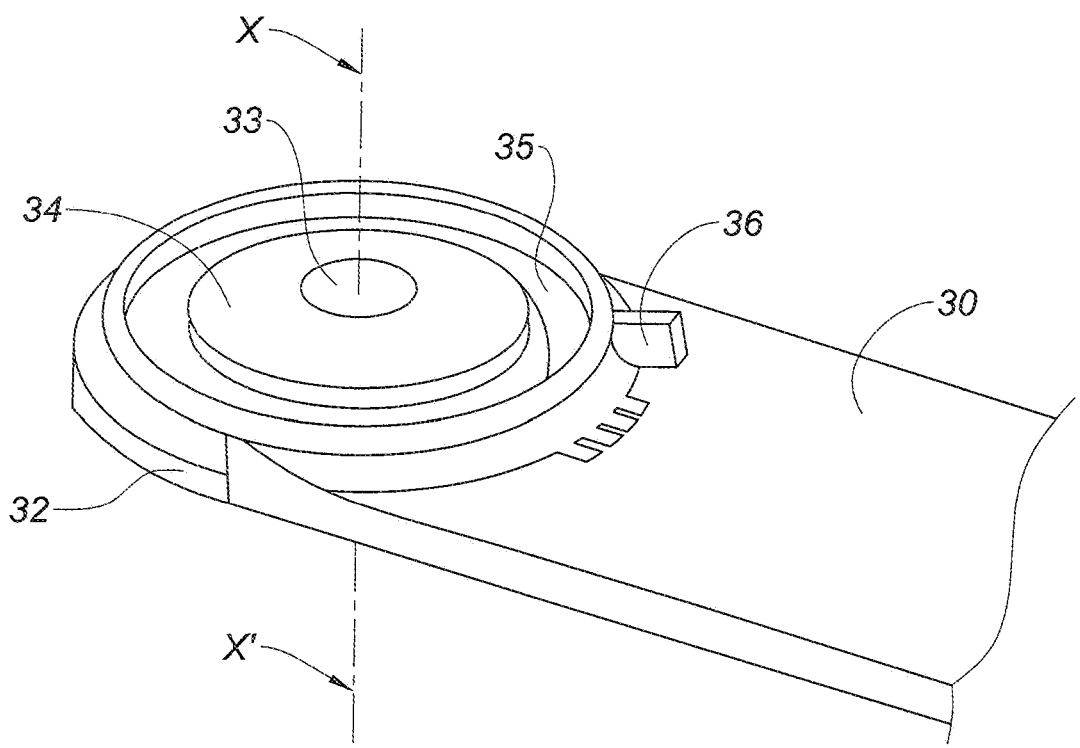
FIG. 3 is an enlarged perspective view of the end of a temple of the spectacle frame in FIGS. 1 and 2, which end is intended to be fixed to a side lug by means of a hinge.

FIG. 3 shows more precisely the structure of the front end 32 of the right temple 30. Said temple firstly has an opening 33 for the passage of the screw 51 and the cap nut 52, as well as an outwardly inclined annular plate 34, which surrounds the opening 33 and is intended to be separated from the lug 12 by the clearance 60. The temple 30 also has an annular cavity 35 which surrounds the plate 34. Lastly, said temple comprises a catch 36, which cooperates with an element having a complementary shape which is arranged on the lug 12 so that, when the right temple 30 reaches its closed position, the rotation of said temple 30 is stopped, unless there is additional mechanical stress.

Figure 4:
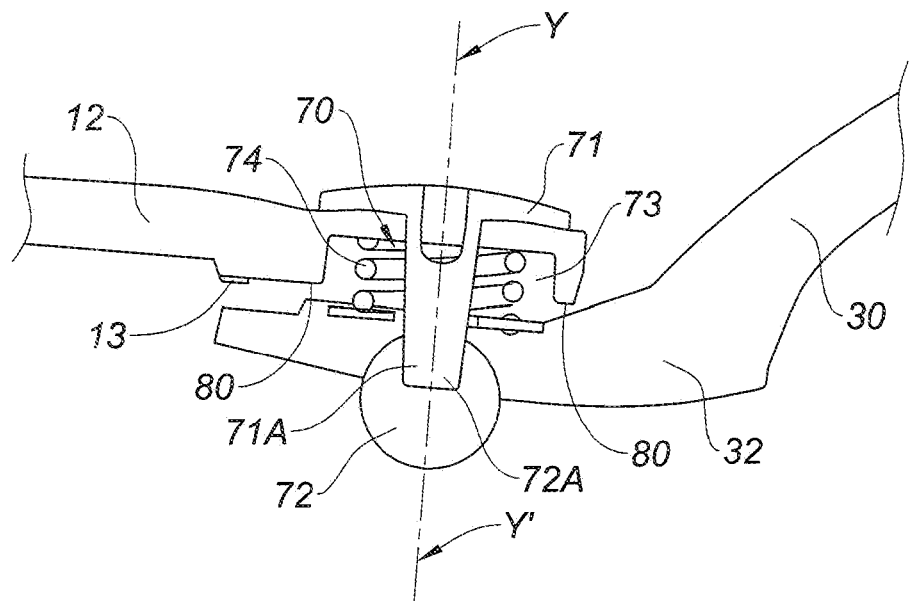
FIG. 4 is a perspective view of a hinge of a spectacle frame according to a second embodiment of the present invention.
Figure 5:
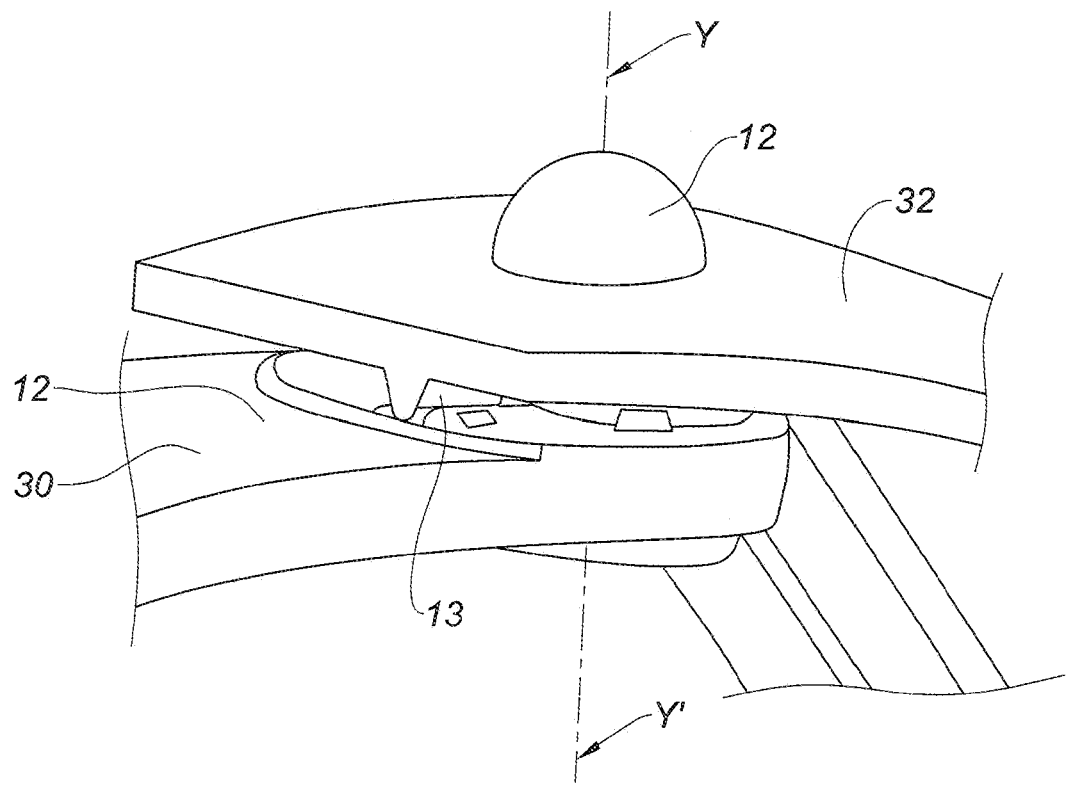
FIG. 5 is a perspective view of the end of a temple of the spectacle frame in FIG. 4, which end is intended to be fixed to a side lug by means of a hinge.

According to a second embodiment of the present invention, illustrated by FIGS. 4 and 5, the right hinge 50 (as well as the left hinge 40) is replaced with a hinge 70 having a hinge pin Y-Y' which is also substantially perpendicular to the lug 12 and to the front end 32 of the temple 30. It comprises a front face member 71, which is rigidly connected to the lug 12 and is in the form of a screw, and a temple member 72, which is rigidly connected to the temple 30 and the shape of which is that of a sphere having a groove 72A, in order to embed the end 71A of the screw 71 therein.

In this embodiment, the screw 71 and the sphere 72 are arranged relative to one another so that the lug 12 and the end 32 are not fully pressed against one another, but instead provide a clearance 80 similar to the above-described space 60. This space 80 makes it possible for the temples 20 and 30 to pass easily and without rubbing from their open position to their closed position (and vice versa).

Moreover, the lug 12 has, opposite the front end 32 of the temple 30, a cavity arranged to provide a space 73 for housing a spring 74. This spring, arranged so as to function in a compressed state, bears against the lug 12 and the temple 30. In this way, the clearance 80 can be enlarged, to the extent that the spring 74 makes it possible to reduce a relative distance between the temple 30 and the lug 12 in a given direction when said temple 30 pivots about the hinge pin Y-Y'.

A catch, to prevent rotation of the temple 30 in the closed position unless there is additional mechanical stress, is also arranged at the coupling region between the lug 12 and said temple 30. This catch 13 is arranged on the lug 12 and is intended to cooperate with an element (not shown) having a complementary shape which is arranged on the temple 30.

The invention claimed is:

1. Spectacle frame comprising a front face which is extended by two side lugs, and two temples which are articulated to the lugs about the hinge pins of two hinges, the hinges each comprising a front face member, which is rigidly connected to a lug, and a temple member, which is rigidly connected to a temple, each of the temples being arranged to pass, by rotation about said hinge pin, from an open position, where said temple extends the lug, to a closed position, where said temple is pressed against the front face wherein, in at least one of the hinges, the hinge pin is substantially perpendicular to the lug and to the temple, and the front face member and the temple member are arranged so as to provide, between said lug and said temple, a clearance providing play between them which prevents them from rubbing against one another when passing from the open position to the closed position.

2. The spectacle frame according to claim 1, wherein the front face member and the temple member of at least one hinge are a cap nut and a screw respectively.

3. The spectacle frame according to claim 2, wherein the screw and the cap nut of the hinge are fixed to the lug and to the temple respectively by means of O-rings.

4. The spectacle frame according to claim 1, wherein the front face member and the temple member of at least one hinge are a hinge screw and a ball nut respectively.

5. The spectacle frame according to claim 4, wherein the ball nut is embedded at least in part in the temple.

6. The spectacle frame according to claim 4, wherein a space is provided between the lug and the temple for housing a compressed spring, which is arranged to bear against said lug and said temple.

7. The spectacle frame according to claim 5, wherein a space is provided between the lug and the temple for housing a compressed spring, which is arranged to bear against said lug and said temple.

8. The spectacle frame according to claim 1, wherein a catch for stopping rotation of the temple in the closed position is arranged on the lug and said temple.

9. Hinge for a spectacle frame according to claim 1, said hinge having a hinge pin about which a temple is articulated to a lug of said spectacle frame, said hinge comprising a front face member, which is rigidly connected to a lug, and a temple member, which is rigidly connected to a temple, wherein said hinge pin is substantially perpendicular to the lug and to the temple, and in that the front face member and the temple member are arranged so as to provide, between said lug and said temple, a clearance providing play between them which prevents them from rubbing against one another when passing from the open position to the closed position of said temple.

10. Spectacle frame comprising a front face which is extended by two side lugs, and two temples which are articulated to the lugs about the hinge pins of two hinges, the hinges each comprising a front face member, which is rigidly connected to a lug, and a temple member, which is rigidly connected to a temple, each of the temples being arranged to pass, by rotation about said hinge pin, from an open position, where said temple extends the lug, to a closed position, where said temple is pressed against the front face wherein, in at least one of the hinges, the hinge pin is substantially perpendicular to the lug and to the temple, and the front face member and the temple member are arranged so as to provide, between said lug and said temple, a clearance providing play between them which prevents them from rubbing against one another when passing from the open position to the closed position, and wherein the front face member and the temple member of at least one hinge are a hinge screw and a ball nut respectively.

11. The spectacle frame according to claim 10, wherein the ball nut is embedded at least in part in the temple.

12. The spectacle frame according to claim 11, wherein a space is provided between the lug and the temple for housing a compressed spring, which is arranged to bear against said lug and said temple.

13. The spectacle frame according to claim 10, wherein a space is provided between the lug and the temple for housing a compressed spring, which is arranged to bear against said lug and said temple.

* * * * *